United States Patent [19]
Porter et al.

[11] Patent Number: 5,321,613
[45] Date of Patent: Jun. 14, 1994

[54] DATA FUSION WORKSTATION

[75] Inventors: David W. Porter, Annapolis, Md.; James S. Vandergraft, Washington, D.C.; Buddy G. Beck, Fairfax Station, Va.; Bruce P. Gibbs, New Carrollton, Md.

[73] Assignee: Coleman Research Corporation, Fairfax, Va.

[21] Appl. No.: 974,405

[22] Filed: Nov. 12, 1992

[51] Int. Cl.$^5$ .................... G01V 5/00; G06F 15/00
[52] U.S. Cl. ............................................. 364/420
[58] Field of Search .................... 364/420; 250/253

[56] References Cited

U.S. PATENT DOCUMENTS

5,025,150  6/1991  Oldham et al. .................. 250/253

*Primary Examiner*—Gail O. Hayes
*Attorney, Agent, or Firm*—Millen, White, Zelano & Branigan

[57] ABSTRACT

A data fusion workstation provides an apparatus and method for realizing the full potential of geophysical and remote sensing by mathematically integrating sensors with each other. Sensor data from each of a plurality of sensor types are related mathematically to each other through a common site model to produce a fused picture with quantified accuracy. Using the concept of pseudo-data, information in sensor data is made equivalent to data in a statistical correlation model, allowing fusion of model information with sensor data during a data inversion step. The process of data fusion comprises several processing steps, which are executed by various microprocessors in a recursire/distributed/parallel-architecture platform. These steps comprise geophysical inversion, geostatistical Kriging, application of statistical information concepts, implementation of a square root information smoother, and application of likelihood techniques.

10 Claims, 5 Drawing Sheets

DATA FUSION WORKSTATION

A print out of software code has been filed with this application as appendix "A" and is incorporated herein by reference. The print out contains 29 pages.

BACKGROUND OF THE INVENTION

The invention relates to geophysical, geological, and geochemical site characterization, and particularly to site characterization in the context of remediation status determination and/or control programs for hazardous waste sites, pollution (e.g. superfund) sites, and the like. Remediation is required at thousands of government and commercial waste sites covering many hundreds of square miles. Remediation programs require site-characterization prior to remediation, during remediation for monitoring purposes, and after remediation for performance evaluation of new remediation technologies. Site characterization includes, for example, locating point sources of contaminants (buried drums and tanks, waste trenches, pits, waste lagoons, disposal boundaries, etc.), mapping the extent of contaminant or leachate plumes, delineating subsurface geologic features that control pathways for contaminant migration, etc. Current techniques for characterization, monitoring, and performance evaluation for subsurface contamination rely heavily on well-drilling that is risky, slow, costly, and inaccurate. Non-invasive geophysical sensing and remote sensing offer potential for dramatic improvement, but there are no super-sensors for solving all or even most of the characterization problems.

Site characterization provides a surface, subsurface, and supersurface picture of relevant conditions such as contamination, integrity, topography, erosion, etc. that provides the basis for assessing status and, e.g., suitability for exposure to humans. Remediation decisions use site characterization data as an input. Site monitoring of relevant characteristics, such as contamination, can also be conducted during remediation to assess whether remediation is proceeding as planned. Performance evaluation of new remediation technologies can be conducted, for example, in specially-designed tests prior to acceptance of the technologies.

In clean-up scenarios, prior art technology for subsurface characterization, monitoring, and performance-evaluation uses well-drilling to determine the nature and extent of contamination. However, wells puncture natural geological barriers to contaminants and pose the risk of providing additional contaminant pathways. Further, wells can be a health and safety risk to site workers. Well-drilling is also very slow and costly. Tens of wells can cost hundreds of thousands of dollars, and, in some highly contaminated areas, a single well can cost a million dollars. Also, because it is difficult to use well data to characterize contamination between wells, overall characterization may be quite inaccurate.

The use of non-invasive geophysical sensors based on electrical, seismic, gravitational, and magnetic methods, coupled with remote sensing from the air and/or from space offers great potential for site characterization. Non-invasive and remote sensing techniques are by their nature safer, faster, and less costly than invasive techniques. Further, near-continuous lateral coverage can be used to characterize site conditions between point-sources of information, such as well sites, for contamination status determination, thereby improving accuracy.

The difficulty with non-invasive and remote sensing is that no one sensor type provides a complete picture of a site. Consequently, prior art use of such sensors has been limited to forming partial pictures with several sensors and manually combining these pictures with prior site and general knowledge, e.g. geological knowledge, to produce and to interpret a picture. For example, an electrical sensor may detect an underground aqueous contaminant plume, and a seismic sensor may detect an impermeable geological structure. The two pictures can be integrated by persons knowing that the plume must be resting on the geological structure. The validity of the manually-interpreted picture is highly dependent on the skill of the interpreter, and accuracy is difficult to quantify.

INVERSION

Techniques are known for reconstructing sensor data using inversion. Such prior art "manual" data fusion processes fused models with data from multiple sensors after inversion of the sensor data. The data vector z is related to spatial quantities of interest, which we will denote by a vector x. We assume this relation is nonlinear and corrupted by a noise vector v with covariance $\Gamma$. That is, we have the relationship:

$$z = h(x) + v; E v v^T = \Gamma$$

We solve for the environmental image estimate $\hat{x}$ by using Nonlinear Least Squares (NLS). This is carried out by iterating a sequence of linear problems where the iteration number $i$ is:

$$\hat{x}_i = \hat{x}_{i-1} + \left( \frac{\partial h^T}{\partial x} \Gamma^{-1} \frac{\partial h}{\partial x} \right)^{-1} \frac{\partial h^T}{\partial x} \Gamma^{-1} (z - h(\hat{x}_{i-1}))$$

In practice, however, image observability is often a problem, e.g., in time-domain EM, separating layer depth 30 from resistivity may be impossible. Techniques such as ridge regression are used to overcome this problem. Spatial continuity is incorporated by saving old values of some variables (e.g. resistivity) for some distance along the survey line.

KRIGING

The prior art method of estimating spatial continuity is Kriging. In this technique, the spatial continuity of the variables V is modeled over a directed distance h between s and s +h by use of a covariance $C_V(h)$, or equivalently, a variogram $\gamma V(h)$, which are defined as follows:

$$C_V(h) = E(V(s)V(s+h));$$

$$\gamma V(h) = \tfrac{1}{2} E(V(s) - V(s+h))^2 \quad \gamma v(h) = C_V(o) - C_V(h)$$

Any spatial connections with other variables R are modeled by assuming a spatial covariance between these variables.

The data vector x consisting of V and R variables, is estimated from measurements z by using the Best Linear Unbiased Estimator (BLUE). The estimate of x is computed using the mean $\mu_x$ of x the mean $\mu_z$ of z, the covariance between x and z denoted by $P_{xz}$ and the covariance of z denoted by $P_z$ (which is computed from $C_V(h)$ or $yv(h)$) according to:

$$\hat{x} = \mu_i + P_{Iz}P_z^{-1}(z - \mu_z)$$

Care must be taken to account for changing means and variograms.

PSEUDO-DATA

The concept of pseudo-data has been known since the early days of the space program. Sound data inversion techniques were developed for orbit determination, spacecraft navigation and space science where data were often sparse. Underlying models were not explicitly used. At the same time, the Kalman filter was invented to combine data and models and was widely adopted for inertial navigation sensor mixing target tracking and surveillance, and space applications. Unfortunately the Kalman filter was conceptually complicated and numerically unstable. The synthesis of data inversion and a stable form of the Kalman filter as the Square Root Information Smoother (SRIS) was achieved by G. Bierman and colleagues at JPL. See G. J. Bierman, *Factorization Methods for Discrete Sequential Estimation*, Academic Press 1977, the entire disclosure of which is incorporated herein by reference. The result was a conceptually simple and numerically stable combination of data and models using pseudo-data.

The concept of Complete Data began with statistical investigations in diverse fields of agriculture, economics and science, starting in the 1950's. A unified framework was provided in the form of the Generalized Expectation Maximization (GEM) method originally developed by Dempster, Laird, and Rubin. GEM became the cornerstone of the TRIDENT Accuracy Evaluation System (ACES) in the early 1980's. The SRIS technology was brought to full maturity in a recurslye/distributed/parallel architecture by G. Bierman and D. Porter for tuning temporal smoothers. See D. W. Porter, "*Quantitative Data Fusion: A Distributed/Parallel Approach to Surveillance, Tracking and Navigation using Information Filtering,*" JHU/APL Fifth Joint Service Data Fusion Symposium, 1991, the entire disclosure of which is incorporated herein by reference.

SUMMARY OF THE INVENTION

The present invention provides a method and apparatus for realizing the full potential of geophysical and remote sensing by mathematically integrating sensors with each other and, in a preferred embodiment, with prior site models. Sensor data from each of a plurality of sensor types are related mathematically to each other in the form of "pseudo-data" to produce a fused picture with quantified accuracy. This automated data fusion technique is usable by personnel with minimal training. Consequently, the full potential of non-invasive geophysical sensing and remote sensing is realized.

The process of data fusion comprises several processing steps which are executed, e.g., by various microprocessors in a distributed/parallel-architecture platform. These steps comprise, for example, creation of site models, geophysical inversion, geostatistical Kriging, application of statistical information concepts, implementation of a square root information smoother, application of likelihood techniques, application of a Generalized Expectation Maximization (GEM) method, application of residual tests, etc.

Site knowledge can be utilized in the form of pseudo-data by creating a site model using site knowledge and certain parameter estimates to create a physical image and then utilizing the physical image in the inversion process.

Prior art data inversion techniques use site knowledge only to check and combine single sensor inversion results. Further, sensor data from individual sensors were fused manually after inversion of each sensor's data. That is, the fusing was done after the measurement inversion. The present invention uses the pseudo-data concept to automate the data fusion by fusing sensor data simultaneously in a multi-sensor inversion. Thus, the fusing is done while the inversion is carried out. Further, site knowledged in the form of pseudo-data can be fused directly into the multi-sensor inversion. Environmental Data fusion is the first application of the pseudo-data concept to spatial, as opposed to temporal, problems.

Site models usually contain uncertain parameters. Some additional data, called complete data, while not measured directly, can often be estimated from actual data and used to determine the model parameters.

The data inversion step serves to quantify the uncertainty of models by computing standard deviations of the reconstruction error. Geophysical inversion reconstructs an environmental image using data from a plurality of sensors by inverting forward models that map physical images into data. In this respect, multi-sensor data and site models are tied together by inversion over space and time. The inversion process is recursire and seeks to shape an environmental image until the output data is consistent with predictions. In this respect, data inversion computing quantifies uncertainty by reconstruction error standard deviations.

Knowledge about spatial continuity is represented by a statistical correlation model which is computed by Kriging. Geostatistical Kriging fills in missing data using spatial continuity expressed in a statistical correlation model (variogram) to interpolate from measured data.

Statistical information concepts are applied to the data to unify inversion and Kriging for data fusion by recognizing the mathematical equivalence of information in the data and information in the statistical correlation model. Information concepts break the fusion process into manageable pieces by compressing local data while retaining information to give a spatially recurslye, distributed, parallel architecture.

The square root information smoother (SRIS) is implemented with numerically sound Householder and Givens rotations.

Likelihood techniques provide estimates for parameters, detect spatial discontinuity and change, and provide sensor validation, Implementation of the Generalized Expectation Maximization (GEM) method is used to estimate physical and statistical parameters. Environmental data fusion is the first application of GEM for tuning a spatial, as opposed to temporal, smoother.

Residual testscan be performed to detect discontinuities in the models.

Output of the data fusion workstation includes, e.g., an image of geophysical conditions over space and time.

The foregoing and other objects, features, and advantages of the invention will be apparent from the following more particular description of preferred embodiments as illustrated in the accompanying drawings in which reference characters refer to the same parts throughout the various views. The drawings are not

DETAILED DESCRIPTION OF THE EMBODIMENT

Figure 1:
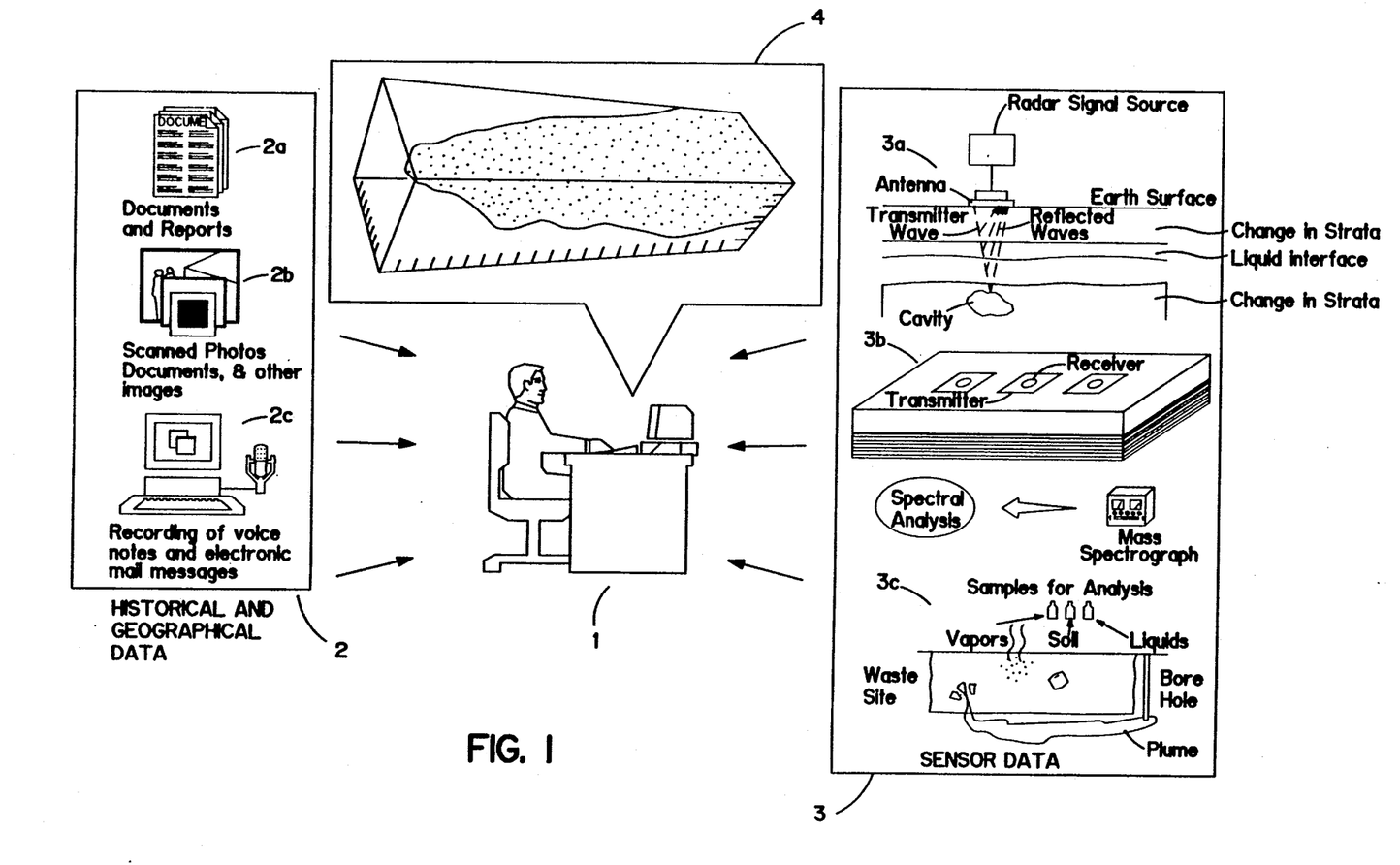
FIG. 1 illustrates a general principle of the invention according to a preferred embodiment.

Referring to FIG. 1, the data fusion workstation, denoted generally at reference numeral 1, fuses historical and geographical data 2 with measurement data 3 taken for a particular site. Site history and previous survey results are used to establish a priori geological/hydrological/geochemical/geostatical, etc., model structures for input to the fusion workstation. Measurement data on a wide variety of storage media at various stages of pre-processing are also input into the system.

In a preferred aspect, the invention provides a data fusion workstationwhich receives data signals from sensors 3a, 3b, 3c, and receives historical and geographical data 2a, 2b, 2c, analyzes and modifies the data signals, and provides output 4 representing a given site, thereby enabling knowledgeable decisions to be made regarding the site. Such decisions include the need for remediation, the effects of ongoing remediation procedures, the effectiveness of particular remediation procedures, etc.

A variety of sensor types 3 are possible for use with the data fusion system. Non-limiting examples include: electromagnetic induction (EMI), ground penetrating radar (GPR), seismic reflection/refraction, magnetic, induced polarization, radiological, airborne photographic, airborne infrared, gas chromatography/mass spectrometry, imaging spectrometer, SAR radar, Landsat/SPOT, gravity, cone penetrometer, borehole sensors, etc. A record of sensor types is used to establish a priori sensor model structures, including georeference error models. Also input to the system are sensor calibrations from separate calibrating procedures or on-line calibration. Finally, operating conditions, such as those relating to geometry and time, are input to the system.

Various types of historical and geographical data 2a, 2b, 2c, are input to the data fusion workstation. Non-limiting examples include: ground-level and aerial photographs, maps, files and records, blueprints and other structural information, well loggings and other survey data, oral testimony, etc.

The data fusion workstation according to a preferred embodiment has as its output 4 the following:

preliminary data quality assessment, including a display of data in space and time and the results of statistical tests for gross errors, abnormal noise levels, and calibration errors;

final data quality assessment, including a display of data in space and time, a display of measurement residuals in space and time, and the results of statistical residual tests for diagnosis of site or sensor abnormalities;

a site model and parameters, including a hypothesized model structure selected and parameter estimates, and quantified estimate quality;

spatial and temporal variables, including current estimates and future projections, and quantified quality; and, Data Quality Objectives (DQO's), including an initial field operations plan produced in simulation mode and including updates to the field operations plan based on site data analysis.

Spatial Correlation Via Autoregression (AR)

Figure 2:
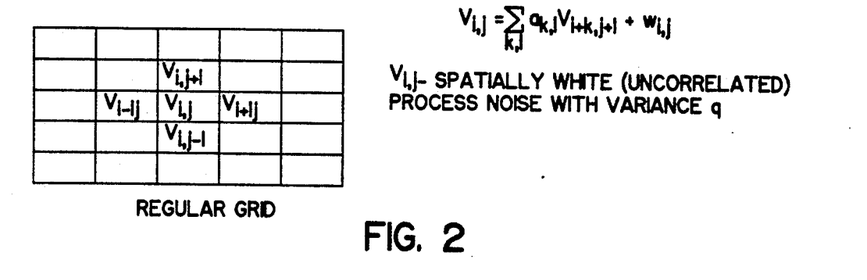
FIG. 2 shows a diagram of a regular grid.

According to a preferred embodiment of the invention, spatial correlation is accomplished by means of an autoregression technique. Referring to FIG. 2, spatial continuity of the variables V is represented by the ability to linearly interpolate V on a regular grid with interpolating coefficients $a_{k,1}$ and interpolation error $W_{i,j}$. For sufficiently high order interpolation, the interpolation errors $w_{i,j}$ should be white. Under the same kind of statistical stationarity conditions behind the statistical correlation model of Kriging, the spatial AR model of sufficiently high order is essentially an equivalent representation of spatial continuity. Spatial connections with other variables can be modeled by using a vector spatial AR process. A third spatial dimension is readily added.

Unifying Information Concepts; Pseudo Data

As stated above, prior art "manual" data fusion processes fused models with data from multiple sensors after inversion of the sensor data. According to a preferred embodiment of the present invention, pseudo-data is generated from statistical correlation models which incorporate site knowledge. This allows information in the statistical correlation model to be made equivalent to information in the sensor data so that the site knowledge may be fused with the sensor data during a data inversion step. The output of the data fusion process according to the present invention thereby has quantifiable uncertainty associated with it.

We first separate the spatial quantities x for inversion into a spatially correlated vector V and the remaining variables R and express the spatial AR model as pseudo-data giving the total data:

$$z = h\left(\begin{bmatrix} R \\ V \end{bmatrix}\right) + v$$

$$o = -V_{i,j} + \sum_{k,l} a_{k,l} V_{i+k,j+l} + w_{i,j}$$

Performing inversion on the new total data, by using non-linear least squares, is a synthesis of inversion and Kriging. Spatial continuity is now explicitly incorporated in the data inversion process so that data from the same sensor at different locations can be systematically combined. Variable means can be incorporated by use of trending, e.g., using splines with coefficients in R.

First principles models can be explicitly included as pseudo-data in the inversion process, with model uncertainty being represented by process noise or included as deterministic constraints. For example, dominant time-domain EM effects can be captured with a simplified finite element model using R variables, with model errors accounted for by means of an AR model using V variables. Data from multiple sensors can be stacked together to perform data fusion by joint inversion. The cumulative o effect of data will greatly improve the observability and will remove the confusion of inconsistency between sensors. Sensor calibration and registration errors can be estimated through data redundancies by including the errors in R.

New Computing Architecture

Applications of these concepts to many problems of interest, including environmental applications, were stymied by computational difficulties. The present invention overcomes these difficulties as follows.

Information Principles

The application of Information Principles serves to break the fusion process into manageable pieces. An entire family of recursire/parallel/distributed fusion architectures can be designed to satisfy different computing requirements. This is made possible by applying general information principles such as:

- Use of data and pseudo-data once and only once.
- Use of constraints freely, but at least once.
- Data and pseudo-data can be reused if information is diluted so total information is conserved.
- Data and pseudo-data can be deleted, but with loss of information that is correctly reflected in the computed uncertainty.
- Faulty data previously fused can be removed by fusing imaginary data using square root of $-1$.

Figure 3:
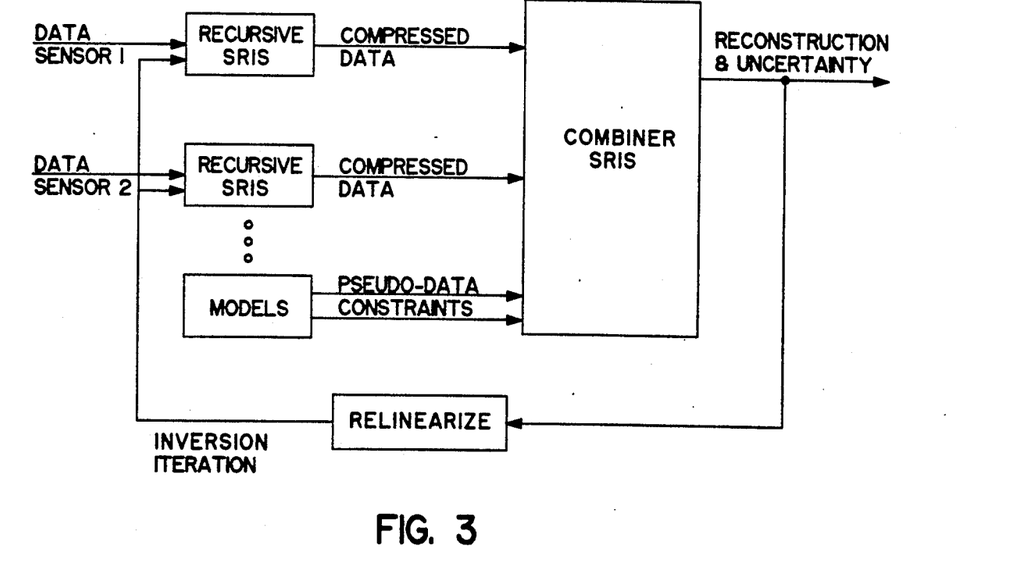
FIG. 3 is a block diagram which illustrates the recurslye/distributed/parallel architecture of the invention according to a preferred embodiment.

FIG. 3 illustrates the recursive/distributed/parallel architecture of the present invention according to a preferred embodiment. Sensor data from sensors 1, 2, n, taken directly from those sensors or from storage media, are subjected to parallel Square Root Information Smoothing. The resulting compressed data is fused with pseudo-data from site models by the combine SRIS to obtain a fused reconstruction of the data over space and time and to output a quantified error calculation- The information principles set forth above are applied during each iteration of the inversion. It will be understood by those skilled in the art that each of the processes (recursire SRIS for each sensor, combinet SRIS, relinearization, etc.) may be carried out by independent microprocessors acting in parallel, by a single microprocessor with parallel processing capabilities, or by conventional processing architectures. The particular computing architecture according to the present invention is described in further detail in internal document number CLM/92-345 entitled *Data Fusion Workstation, Model Review and Demonstration*, which will be made publiclyavailable, available, and in document number CLM/92-367 6314 entitled *Concept of Operations*, which will be made publicly-available, the entire disclosures of which are hereby incorporated by reference.

Information Array Manipulations

Figure 4:
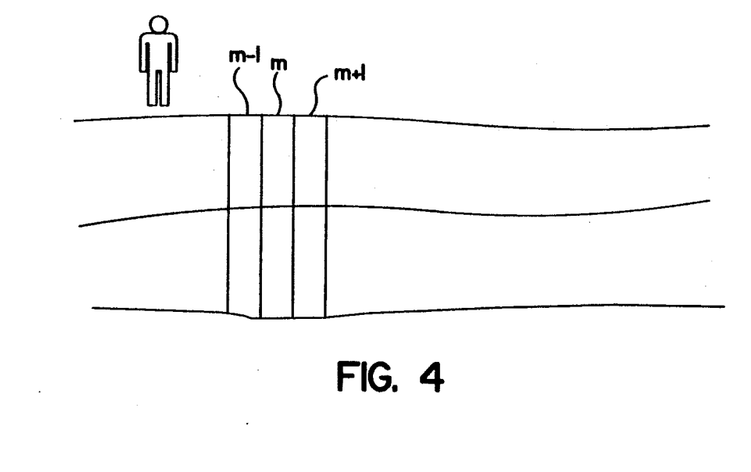
FIG. 4 illustrates a Concept related to the information array manipulations according to a preferred embodiment of the invention.

Referring to FIG. 4, we first collect the variables R and V in appropriate size layers m as $R_m$ and $V_m$, defined as deviations from $\hat{x}_i(\hat{R}_i, \hat{V}_i)$ of the previous iteration. Next, stack the data and pseudo-data, indexed by m, so that moving forward through the data brings in R and V for higher m and leaves behind data corresponding to lower m. Scale the noise parameters, v and $w_i$ to have identity covariance, and arrange the linearized equations in information array form. Notice the banded structure, with bandwidth b, where $L_m$ and $\hat{V}_{m,i}$ are clear from context. Some type of a priori information is provided for R.

$$\frac{\partial h_m}{\partial R, V} \begin{bmatrix} R_{m-b} \\ V_{m-b} \\ \vdots \\ R_m \\ V_m \\ \vdots \\ R_{m+b} \\ V_{m+b} \end{bmatrix} = z_m - h_m(\hat{R}_i, \hat{V}_i) - v_m$$

$$L_m \begin{bmatrix} V_{m-b} \\ \vdots \\ V_m \\ \vdots \\ V_{m+b} \end{bmatrix} = 0 - L_m \hat{V}_{m,i} - w_m$$

Linearized Equations

Information Array $$\begin{array}{c} m-1 \quad m \quad m+1 \\ \begin{matrix} x & . & . & x & . & . & x \\ x & . & . & x & . & . & x \\ x & . & . & x & . & . & x \\ x & . & . & x & . & . & x \\ x & . & . & x & . & . & x \\ x & . & . & x & . & . & x \end{matrix} \\ |\leftarrow \quad \rightarrow| \\ \text{Bandwidth b} \end{array}$$

$$\begin{array}{l} \vdots \\ z_{m-1} - h_{m-1}(\hat{R}_i, \hat{V}_i) \\ 0 - L_{m-1}\hat{V}_{m-1,i} \\ z_m - h_m(\hat{R}_i, \hat{V}_i) \\ 0 - L_m\hat{V}_{m,i} \\ z_{m+1} - h_{m+1}(\hat{R}_i, \hat{V}_i) \\ 0 - L_{m+1}\hat{V}_{m+1,i} \\ \vdots \end{array}$$

Triangularizing Rotations (TR)

The key to using the information array to carry out the fusion efficiently and accurately is the application of triangularizing rotations (TR).

$$Hy = z - v; \; Evv^T = I$$
$$\downarrow TR$$

$$\begin{bmatrix} H'_{11} & H'_{12} & H'_{13} \\ & H'_{22} & H'_{23} \\ 0 & & H'_{33} \\ -- & & -- \\ & 0 & \end{bmatrix} \begin{bmatrix} y_1 \\ y_2 \\ y_3 \end{bmatrix} = \begin{bmatrix} z'_1 \\ z'_2 \\ z'_3 \\ \cdots \\ e \end{bmatrix} - \begin{bmatrix} v'_1 \\ v'_2 \\ v'_3 \\ \cdots \\ r \end{bmatrix};$$

|  | $R_{m-b}$ | $V_{m-b}$ | ... | $R_m$ | $V_m$ | ... | $R_{m+b-1}$ | $V_{m+b-1}$ | $R_{m+b}$ | $V_{m+b}$ | $x$ |
|---|---|---|---|---|---|---|---|---|---|---|---|
| Triangularized information array from recursion m − 1 | x | x | ... | x | x | ... | x | x | 0 | 0 | x |
|  |  |  |  |  |  |  |  |  | 0 | 0 | x |
|  |  |  |  |  |  |  |  |  |  |  |  |
|  |  |  |  | x | x | ... | x | x | 0 | 0 | x |
|  |  |  |  |  | x | ... | x | x | 0 | 0 | x |
|  |  |  |  |  |  |  |  |  |  |  |  |
| Data and pseudo-data for measurement m including $R_{m+b}$ $V_{m+b}$ for first time |  | 0 |  |  |  |  | x | x | 0 | 0 | x |
|  |  |  |  |  |  |  |  | x | 0 | 0 | x |
|  | x | x | ... | x | x | ... | x | x | x | x | x |
|  | x | x | ... | x | x | ... | x | x | x | x | x |
|  |  |  |  |  |  |  | Recursion m |  |  |  |  |
|  |  |  |  |  |  |  | ↓ TR |  |  |  |  |
| Starred array left behind since $R_{m-b}$ $V_{m-b}$ never seen again | * | * | ... | * | * | ... | * | * | * | * | * |
|  | * | * | ... | * | * | ... | * | * | * | * | * |
|  |  |  |  |  |  |  |  |  |  |  |  |
|  |  |  |  | x | x |  | x | x | x | x | x |
|  |  |  |  |  | x |  | x | x | x | x | x |
|  |  |  | 0 |  |  |  |  |  |  |  |  |
|  |  |  |  |  |  |  |  |  |  |  |  |
| Triangularized information array to be carried forward from recursion m |  |  |  |  |  |  | x | x | x | x | x |
|  |  |  |  |  |  |  |  | x | x | x | x |
|  |  |  |  |  |  |  |  |  | x | x | x |
|  |  |  |  |  |  |  |  |  |  | x | x |
|  |  |  |  |  | 0 |  |  |  |  |  | $e_m$ |

$$Ev'v'^T = I$$

$$\hat{y}_3 = \frac{z'_3}{H'_{33}}, \; \hat{y}_2 = \frac{z'_2 - H'_{23}\hat{y}_3}{H'_{22}}, \; \hat{y}_1 = \frac{z'_1 - H'_{12}\hat{y}_2 - H'_{13}\hat{y}_3}{H'_{11}}$$

A three-variable example illustrates the ability of TR to make it possible to compute the desired estimates. The problem is rotated until the solution can be written by inspection. TR preserves information because TR is a nonsingular transformation. Since TR is also a rotation, the measurement noise retains its identity covariance. Rotations do not amplify numerical errors, so TR is numerically stable TR can be efficiently implemented using the time proven work horses of linear algebra; namely, Householder and Givens rotations.

Square Root Information

TR is used to generate square root information arrays as follows:

$$\left. \begin{array}{l} Hy = Z - v \\ H'y = z' \end{array} \right\} \Rightarrow H'(y - \hat{y}) = -v' \Rightarrow E(y - \hat{y})(y - \hat{y})^T = H'^{-1} H'^{-T}$$

Information = (variance of error)$^{-1}$ = $H'^T H'$
$H'$ = Square Root Information The triangularized square root information plays a central role in the Square Root Information Smoother, (SRIS) which will be described next. Also, square root information is the key to compressing data from a large vector z to a small vector z' without losing any information about x.

Recursive Centralized SRIS

The forward pass through the data proceeds as follows:

The starred information array equations that are left behind have the form:

$$H^*_{m1} \begin{bmatrix} R_{m-b} \\ V_{m-b} \end{bmatrix} + H^*_{m2} \begin{bmatrix} R_{m-b+1} \\ V_{m-b+1} \\ \cdot \\ \cdot \\ R_m \\ V_m \\ \cdot \\ \cdot \\ R_{m+b} \\ V_{m+b} \end{bmatrix} = z^*_m - v^*_m$$

The compressed information array equations that are carried forward are:

$$H'_m \begin{bmatrix} R_{m-b+1} \\ V_{m-b+1} \\ \vdots \\ R_m \\ V_m \\ \vdots \\ R_{m+b} \\ V_{m+b} \end{bmatrix} = z'_m - v'_m$$

The same type of information array manipulation can provide recurslye/distributed/parallel architecture also. The recursive formulation breaks the large-scale inversion into manageable pieces by compressing local data before forming the estimates.

FILTERED ESTIMATES AND UNCERTAINTIES

During the forward sweep through the data, the elements in the information array can be used to compute filtered estimates and uncertainties. If the variables of interest to be estimated at recursion m are:

$$y_m = \begin{bmatrix} R_{m-b+1} \\ V_{m-b+1} \\ \vdots \\ R_m \\ V_m \\ \vdots \\ R_{m+b} \\ V_{m+b} \end{bmatrix}$$

then the estimate, given data up to and including $z_m$, is:

$$\hat{y}_{m/m} = H'^{-1}_m z'_m$$

The estimate errors are:

$$\tilde{y}_{m/m} = y_m - \hat{y}_{m/m}$$

The uncertainty in the estimate is computed from the information array according to:
$$P_{\tilde{y}^- m/m} = E \tilde{y}_{m/m} \tilde{y}^T_{m/m} = H'^{-1}_m H'^{-T}_m$$

Note that $H'_m$ is upper triangular, so the inversion can be done efficiently.

Estimates and uncertainties for variables left behind during the forward pass are provided by a backward-pass through the compressed starred arrays.

SRIS ESTIMATES AND ESTIMATE ERRORS

The estimate at the final measurement, $z_M$, is given by:

$$\hat{y}_{M/M} = H'^{-1}_m z'_M$$

Estimates of the variables left behind during the backward recursion are substituted into the starred array for $m = M, M-1, M-2, \ldots$. The inverse of the upper triangular $H^*_{M-1}$ is easily found by backward substitution:

$$\begin{bmatrix} \hat{R}_{m-b/M} \\ \hat{V}_{m-b/M} \end{bmatrix} = H^{*-1}_{m1} (z^*_m - H^*_{m2}\hat{y}_{m/M})$$

Equations from the information array, where $V'_M, V^*_M, v^*_{M-1} \ldots$ is a white sequence of identity covariance M give:

$$y_M = H'^{-1}_M z'_M - H'^{-1}_M v'_M \begin{bmatrix} R_{m-b} \\ V_{m-b} \end{bmatrix} =$$

$$H^{*-1}_{m1}(z^*_m - H^*_{m2}y_M) - H^{*-1}_{m-1}v^*_m$$

$$\tilde{y}_{M/M} = -H'^{-1}_M v'_M$$

The estimate error sequence is a backwards autoregressive (AR) process. An equivalent AR representation defined for arbitrary sequencing of variables to be estimated is:

$$\begin{bmatrix} \tilde{R}_{m-b/M} \\ \tilde{V}_{m-b/M} \end{bmatrix} = H^{*-1}_{m1} H^*_{m2}\tilde{y}_{m/M} - H^{*-1}_{m1} v^*_m$$

A backwards AR redefined to emphasize the AR nature where $A_{mk}$ are defined by context is:

$$\begin{bmatrix} \tilde{R}_{m-b/M} \\ \tilde{V}_{m-b/M} \end{bmatrix} = \sum_{k=M+1}^{m+2b} A_{mk} \begin{bmatrix} \tilde{R}_{k-b/M} \\ \tilde{V}_{k-b/M} \end{bmatrix} + w^*_m;$$

$$m = M, M-1, \ldots$$

$$Ew^*_m w^{*T}_m = H^{*-1}_{m1} H^{*-T}_{M1 w}$$

$$E\tilde{y}_{M/M}\tilde{y}^T_{M/M} = H'^{-1}_M H'^{-T}_M$$

SRIS ESTIMATE UNCERTAINTIES

The covariance between the estimated errors at steps m and n can be estimated during the backward pass. $P_{mm}$ is abbreviated as $P_m$ and is referred to as the estimate uncertainty. The necessary equations are:

$$P_{mm} = E \begin{bmatrix} \tilde{R}_{m-b/M} \\ \tilde{V}_{m-b/M} \end{bmatrix} \begin{bmatrix} \tilde{R}_{m-b/M} \\ \tilde{V}_{m-b/M} \end{bmatrix}^T$$

$$P_m = \sum_{k=m+1}^{m+2b} A_{mk} P_{km} + H^{*-1}_m H^{*-T}_{m1};$$

$$m = M, M-1, \ldots$$

$$P_{m,l} = \sum_{k=m+1}^{m+2b} A_{mk} P_{kl}, \quad l = m+1, m+2, \ldots, m+2b$$

The quantities, $P_m$ and $P_{m,l}$ for $m = M+1, \ldots, M+2b$ and $l = M+1, \ldots, M+2b$ are provided by elements of the matrices $H'^{-1}_m H'^{-T}_m$.

The covariance of an AR process satisfies its own AR representation. This fact provides the justification for the preceding equations.

The backward pass to compute the estimate uncertainties fills in the diagonal band of width b in the covariance of the estimate errors stacked over all m.

Additional elements of the covariance can be filled in by running the $P_{m,l}$ recursion beyond 1 m+2b. Some additional covariances may be needed for GEM estimation of some unknown parameters. The NLS iteration is performed by linearizing about the backward pass estimates. Computations can be minimized by relinearizing about forward pass estimates (referred to as extended estimation) as long as the estimation residuals do not degrade. A hybrid approach of linearizing about a backward pass window (referred to as iterated extended estimation) balances the computational burden with statistical accuracy.

SENSOR AND SITE MODEL VALIDATION

Anomalous behavior is best detected by predicting the data assuming normal behavior and then finding discrepancies. These discrepancies may include, for example, site model faults, spatial discontinuity, incorrect structure, incorrectly tuned parameters, sensor faults, sensor failure, occasional gross errors, lack of calibration, lack of registration, etc.

Figure 5:
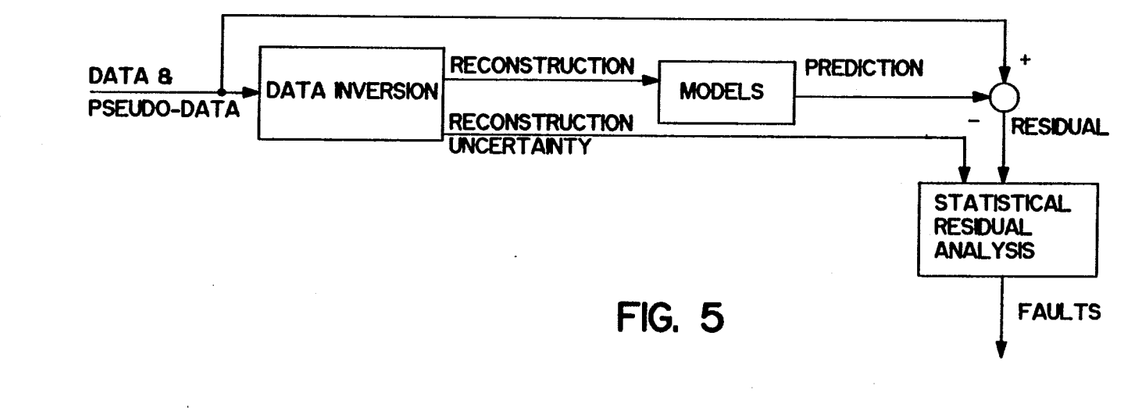
FIG. 5 illustrates a method of statistical residual analysis according to a preferred embodiment of the invention.

Referring to FIG. 5, statistical residual analysis identifies discrepancies by using data/model residuals and reconstruction uncertainty to compute faults.

DETECTION OF SPATIAL DISCONTINUITY AND CHANGE AND SENSOR VALIDATION

The residual sum of squares (SOS) is defined to be:

$$\Sigma m(z_m(\hat{R}_{ig}\hat{V}_j))^T(z_m - h_m(\hat{R}_{ig}\hat{V}_j)) + (L_m\hat{V}_{mi})^T(l_m\hat{V}_{m,i})$$

Here, $\hat{R}_i$ and $\hat{V}_{mi}$ are the converged NLS whole value estimates for R and V. Notational ambiguity is clear from context. We also write $SOS = \Sigma_{Mem}{}^T e_m$.

If the spatial models are good and there are no data anomalies, then SOS is a chisquared random variable with k degrees of freedom, where k equals the total number of scaler measurements in $z_m$ over all m. For k>20, SOS is essentially Gaussian with mean k and variance 2k.

If SOS is outside the interval from $k-\sqrt{2k}$ to $(k+5\sqrt{2k}$, then something must be wrong with the models or the data and a problem has been detected. Once a problem is detected its source can be isolated by examining individual residuals and trying alternative hypotheses for the problem until SOS is statistically reasonable. GEM provides a way to estimate unknown parameters during hypothesis testing and motivates the isolation of the source of problems.

PARAMTER TUNING USING COMPLETE DATA

In order for the full power of pseudo-data to be realized, uncertain, but changing, parameters in the Kriging and the first principles models must be determined. That is, we must tune while inverting. If complete data had been taken directly for the site .. models, then all of these parameters could have been determined. Complete data are estimated from the actual data and are used to determine model parameters iteratively.

Figure 6:
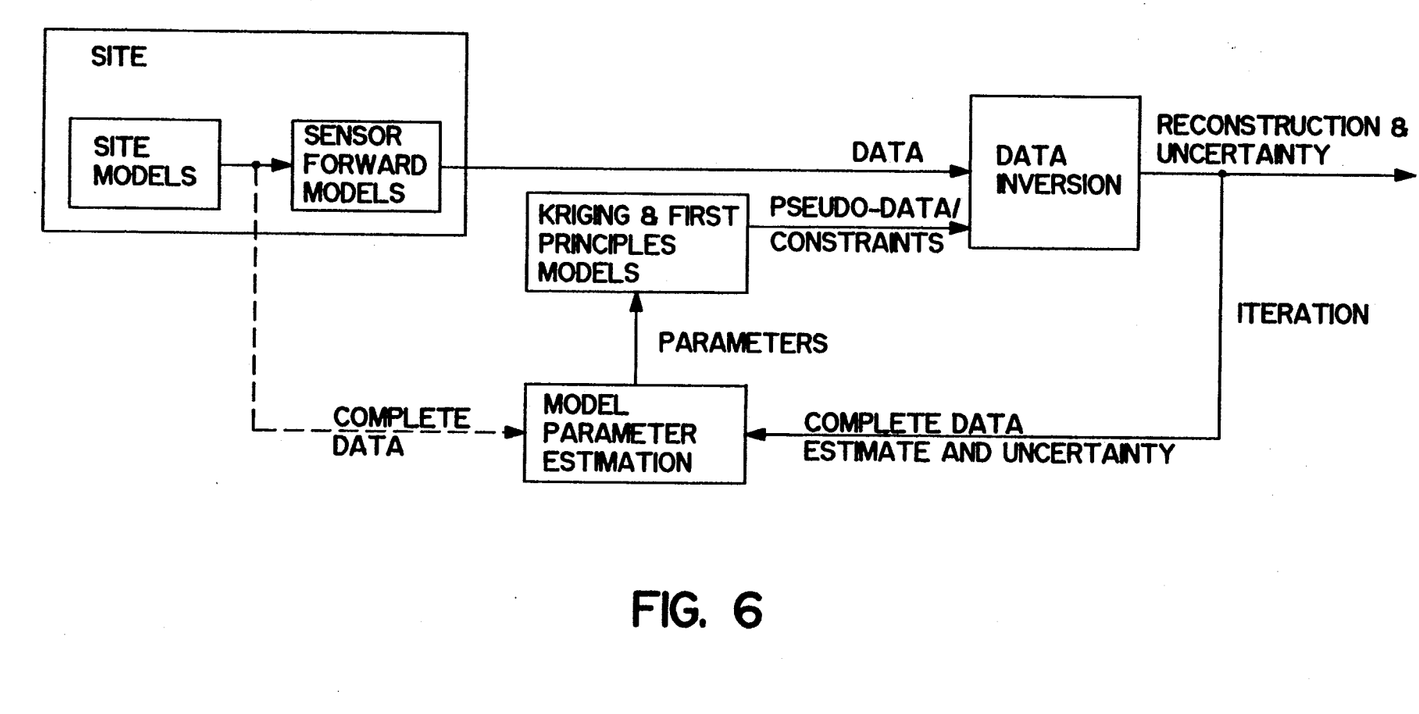
FIG. 6 illustrates the concept of parameter tuning during inversion, as utilized in a preferred embodiment of the present invention.

Referring to FIG. 6, a plurality of inversion iterations are performed using changing model parameter estimations to produce data reconstruction with a desired quantified uncertainty.

PARAMETER ESTIMATION USING GEM

In order to track changes in spatial continuity, first principles relationships, or in sensor behavior, the data fusion system according to a preferred embodiment uses Generalized Expectation Maximization (GEM) to adjust the model parameters whenever necessary.

A central problem is to determine values for parameters (such as process noise strength and correlation distances in statistical AR model) for processes that are not directly measured. GEM looks through the indirect data to the unmeasured process by using the concept of complete data. Indirect data is incomplete in the sense that standard techniques do not provide simple parameter estimates.

Complete data is chosen so that if the complete data had been measured, then parameter estimates would have been simple. If incomplete data is a deterministic function of complete data, independent of unknown parameters, then GEM provides a simple iterative method for parameter estimation.

GEM converges to the Maximum Likelihood (ML) parameter estimate. The ML estimate has many desirable statistical properties, such as being asymptotically (as more and more data are gathered) unbiased and of minimum estimate error variance. GEM can be applied on a local window of data to track spatial changes.

GEM HEURISTIC MOTIVATION

Consider the problem of determining the process noise strength (variance q) of an indirectly measured statistical AR process, of the form:

$$V_{ij} = \Sigma_{k,l} a_{kl} V_{i+k,j=l} + \Sigma_{ij} E w_{ij}^2 = q$$

If $V_{ij}$ had been directly measured, noise free on a regular grid with N measurements, then a sensible estimate is the sample variance of $W_{ij}$ given by:

$$\hat{q} = \frac{1}{N} \Sigma_{ij} (V_{ij} - \Sigma_{k,l} a_{kl} V_{i+k,j+l})^2$$

It might seem reasonable to choose a starting value for q, form $\hat{w}_{ij}$ by using $\hat{V}_{ij}$ from the SRIS, form $\hat{q}$ based on the sample variance of the estimated process noise and iterate:

$$\hat{w}_{ij} = \hat{V}_{ij} - \Sigma_{k,l} a_{k,l} \hat{V}_{i+k,j+l}, \hat{q} = \frac{1}{N} \Sigma_{ij} \hat{w}_{ij}^2$$

The above is almost a GEM algorithm, but $\hat{g}$ will be biased downward due to SRIS estimation errors in $\hat{w}_{ij}$. In the face of noise, SRIS hedges its bets by choosing estimates that lie between an a priori of zero and the true values, on the average. GEM removes this bias by adding the variance of the process noise estimate error, computed from the SRIS as $P_{\hat{w}ij}$ and then iterating according to the formula:

$$\hat{q} = \frac{1}{N} \Sigma_{ij} (\hat{w}_{ij}^2 + P_{\hat{w}ij})$$

THE GEM ALGORITHM

First, choose complete data as V,R and z and denote the parameters to be estimated by 0. Since the incomplete data z is a part of the complete data, then the complete data is a deterministic function of the incomplete data, and is independent of unknown parameters.

Expectation step - Form the expected value of the log likelihood function, which is defined to be the log of the probability density of the complete data, conditioned on the incomplete data and the parameter estimate $\hat{\theta}$ from the last iteration. This gives a function $Q(\theta,\hat{\theta})$:

$$Q(\theta, \hat{\theta}) = E(\ln p(V,R,z/\theta)/z,\hat{\theta})$$

Maximization Step - Maximize $Q(\theta, \hat{\theta})$ over $\theta$ and take the maximizing $\theta$ as the new $\hat{\theta}$ for subsequent GEM iterations.

By assuming statistical independence of V and R, the complete log likelihood function is shown by Bayes Rule to be:

$$\ln p(V,R,z/\theta) = \ln p(z/V,R,\theta) + \ln p(V/\theta) + \ln p(R/\theta)$$

By taking the measurement noise v and the process noise $w_{ij}$ to be Gaussian and zeromean with respective covariances $\Gamma$ and q, we can easily show that, within a constant, $$\ln p(z/V, R, \theta) = -\tfrac{1}{2} \ln|\Gamma| -$$

$$\tfrac{1}{2}\left(z - h\left(\begin{bmatrix}R\\V\end{bmatrix}\right)\right)^T \Gamma^{-1} \left(z - h\left(\begin{bmatrix}R\\V\end{bmatrix}\right)\right)$$

$$\ln p(V/\theta) = \tfrac{1}{2} \ln|L^T q^{-1} L| - \tfrac{1}{2} \Sigma_{ij} \tfrac{1}{q}(V_{ij} - \Sigma_{k,l} a_{k,l} V_{i+k,j+l})^2$$

where L is defined by choosing the same ordering for $V_{ij}$ and $W_{ij}$, stacking them into vectors V and w and then relating V and w by:

$$LV = w$$

With these equations for the log likelihood function, we can now form Q as follows:

$$\boxed{1}$$

$$Q(\theta, \hat{\theta}) = E\left(-\tfrac{1}{2}\ln|\Gamma| - \tfrac{1}{2}\left(z - h\left(\begin{bmatrix}R\\V\end{bmatrix}\right)\right)^T \Gamma^{-1}\left(z - h\left(\begin{bmatrix}R\\V\end{bmatrix}\right)\right)(z, \hat{\theta})\right) +$$

$$\boxed{2}$$

$$E\left(\tfrac{1}{2}\ln|L^T L| - \tfrac{1}{2} N\ln q - \tfrac{1}{2}\Sigma_{ij}\tfrac{1}{q}(V_{ij} - \Sigma_{k,l} a_{k,l} V_{i+k,j+l})^2/z, \hat{\theta}\right) +$$

$$\boxed{3}$$

$$E \ln(p(R/\theta)/z, \hat{\theta})$$

The maximization step sees through the indirect measurements to processes with unknown parameters. All of the coupling between processes is pushed into the expectation step where it is most easily handled. The terms denoted by 1, 2 and 3 correspond, respectively, to sensor processes, statistical AR processes, and first principle processes. The maximization of Q over the elements of $\theta$, for a given process, only involves the terms in Q corresponding to that process. If additional statistically independent sensor, AR, or first principles processes are included, then Q just contains more terms.

For example, to focus on the estimation of q for a statistical AR, the relevant term from Q is 2:

$$\boxed{2} = \tfrac{1}{2}\ln|L^T L| - \tfrac{1}{2} N\ln q -$$

$$\tfrac{1}{2q}\Sigma_{ij} E((V_{ij} - \Sigma_{k,l} a_{k,l} V_{i+k,j+l})^2/z, \hat{\theta})$$

The conditional expectation involves products of $\hat{V}$'s that can be replaced by V's and estimate error covariances from the SRIS:

$$V = \hat{V} + \tilde{V}$$
$$E(V^2/z) = \hat{V}^2 + 2\hat{V}E(\tilde{V}/z) + E(\tilde{V}^2/z)$$

where we have used here the fact that $\hat{V}$ is a deterministic function of z.

The SRIS is unbiased, so the expected value of $\tilde{V}$ zero. Moreover, $\tilde{V}$ does not depend on z; hence, conditional expectation equals the unconditional expectation $E\tilde{V}^2$ from the SRIS.

$$E(\tilde{V}^2/z) = \hat{V}^2 + E\tilde{V}^2$$

Products of V's in the conditional expectation of 2 can be replaced by products of $\hat{V}$'s and estimate error covariances from the SRIS. Replacing V's by $\hat{V}$'s and using the estimate error covariances from the SRIS gives $$\boxed{2} = \tfrac{1}{2}\ln|L^T L| - \tfrac{1}{2} N\ln q - \tfrac{1}{2q}\Sigma_{ij}(\hat{w}_{ij}^2 + P_{\tilde{w}_{ij}})$$

Maximizing over q by setting derivatives to zero gives the final result:

$$\frac{\partial \boxed{2}}{\partial q} = \tfrac{1}{2} N \tfrac{1}{q} + \tfrac{1}{2q^2}\Sigma_{ij}(\hat{w}_{ij}^2 + P_{\tilde{w}_{ij}}) = 0$$

$$\hat{q} = \tfrac{1}{N}\Sigma_{ij}(\hat{w}_{ij}^2 + P_{\tilde{w}_{ij}})$$

GEM theory is somewhat complex, but GEM results are often quite simple and intuitively sensible. Moreover, the GEM results motivate techniques to isolate sources of model and data problems. By using the same type of argument as for expectations in $\boxed{2}$, $\hat{w}_{ij}$ should have zero mean and covariance $q - P_{\tilde{w}_{ij}}$. If $|\hat{w}_{ij}|$ is greater than $5\sqrt{q - p_{\tilde{w}_{ij}}}$, then an adjustment of the AR parameters may be needed or a spatial discontinuity may have been encountered.

Figure 7:
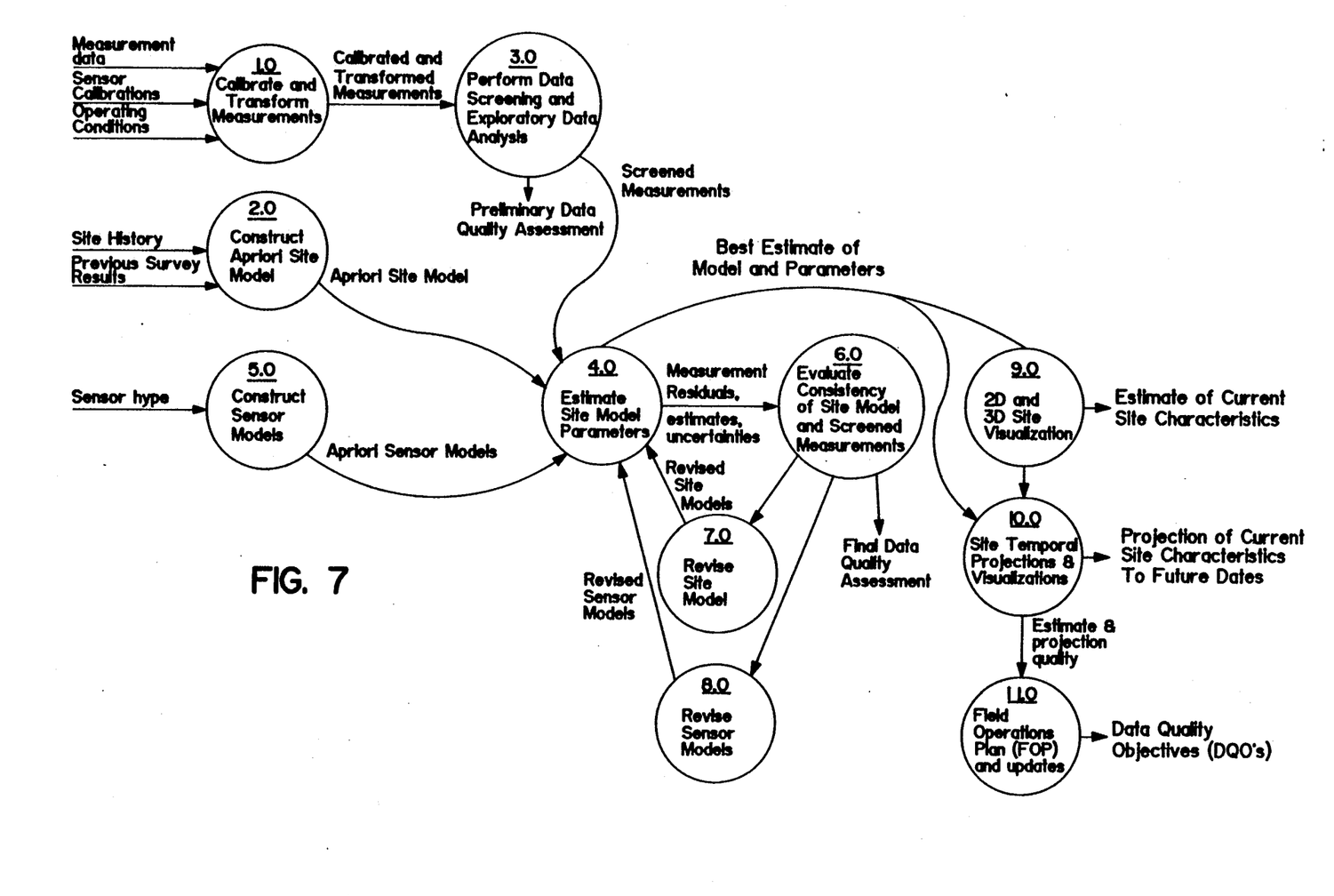
FIG. 7 is a flow diagram illustrating the process of site characterization according to a preferred embodiment of the invention.

FIG. 7 is a flow diagram illustrating the process of site characterization according to a preferred embodiment of the invention. Individual steps in the process are described in detail above.

In a first aspect, the invention creates models in the geological domain. Use of the data fusion workstation in this manner can be made for display of two- and three-dimensional geological sections, geostastistical estimation based on limited data to form surfaces/volumes, volumetric estimation, distribution of physical parameters, etc.

In a second aspect, the data fusion workstation is used to create forward models in the geophysical domain. In this aspect, the invention functions to aid in parameter-selection, sensitivity-analysis, interpretation/inversion, etc.

In a third aspect, the data fusion workstation according to the invention is used to create models in the hydrogeological domain. In this respect, the invention functions to aid in predicting groundwater flow and contaminant migration, history matching of data, risk assessment, design of remediation processing, etc.

In a fourth aspect, the data fusion workstation according to the invention creates models in the geochemical domain. In this respect, the invention functions to predict contaminant behavior (absorption, adsorption, oxidation, reduction, reactions) and to predict contaminant migration, etc.

The data fusion workstation concept can be applied to a variety of efforts, including planning of site-characterization, validation of physical models on data, prediction and design of remediation, monitoring of remediation processes, status assessment, etc.

According to a first embodiment, the data fusion workstation is used for site-characterization. In this embodiment, the data fusion workstation can be used by technical personnel to produce a three-dimensional visualization of subsurface characteristics such as contamination, geological features, etc. The three-dimensional pictures may show contaminant plumes, geological and hydrological features that control contaminant pathways and migration rates, buried objects that are contamination sources, etc. Non-invasive geophysical sensors, remote sensors, and well data are mathematically fused in the workstation to create the three-dimensional picture. Pictures of future contamination can be produced by using flow and transport models to project forward in time. In all cases, the uncertainty in the three-dimensional picture can be quantified statistically and visually displayed. In addition, the data fusion workstation can be run in a simulation mode to establish Data Quality Objectives (DQO's) to meet prespecified characterization accuracy requirements. Establishing DQO's means that types of sensors, acquisition parameters, data densities, and sensor geometries can all be determined before any data are taken. The three-dimensional site-characterization picture can be used by site managers and engineers to assess site characteristics, determine defects, and plan site remediation.

According to a second embodiment of the invention, the data fusion workstation is used for site monitoring during dynamic periods. In this embodiment, the data fusion workstation produces the same kind of results as site characterization, except that monitoring is performed, e.g., after remediation begins. Monitoring provides feedback on remediation to guarantee that remediation is proceeding as planned. Consequently, data fusion for monitoring takes as input remediation operations and uses models of the remediation process to produce a three-dimensional contaminant picture. Further, monitoring must be performed in near-real-time relative to the pace of remediation to provide effective feedback.

According to a third embodiment, the data fusion workstation is used to quantify the relative benefits of alternative remediation technologies. Even though much special instrumentation can be brought to bear in testing, it is often difficult to determine what a specific technique has actually done. Consequently, the fusion of non-invasive geophysical sensors and remote sensors with test models offers great promise for determining the most effective remediation techniques.

While the invention has been particularly shown and described with reference to preferred embodiments thereof, it will be understood by those skilled in the art that various changes in form and details may be made therein without departing from the spirit and scope of the invention.

The embodiments of the invention in which an exclusive property or privilege is claimed are defined as follows:

1. A method of processing electrical signals for site-characterization, comprising:
   collecting measurements in the form of a plurality of electrical signals from a plurality of sensors;
   fusing data representing said plurality of electrical signals while performing data inversion on said data to yield a fused electrical signal representative of at least one physical characteristic of said site;
   using said fused electrical signal in making at least one decision regarding remediation of said site, said remediation having an impact upon said at least one physical characteristic of said site.

2. The method according to claim 1, further comprising:
   collecting historical information concerning characterization of said site;
   creating a site model using said historical information;
   creating pseudo-data by projecting data from said site model over time;
   using said pseudo-data in said fusing step by including said pseudo-data in said data representing said plurality of electrical signals.

3. The method according to claim 1, wherein said at least one decision comprises a determination of whenever remediation of a site is necessary.

4. A method of processing electrical signals for monitoring the status of a remediation program during remediation of a site, comprising:
   collecting measurements in the form of a plurality of electrical signals from a plurality of sensors;
   fusing data representing said plurality of electrical signals while performing data inversion on said data to yield a fused electrical signal representative of at least one physical characteristic of said site;
   using said fused electrical signal in making at least one determination regarding the status of said remediation program.

5. The method according to claim 4, wherein said at least one determination comprises a determination of whether at least one goal for said remediation program has been met.

6. A method processing electrical signals for evaluating the relative benefits of alternative remediation technologies, comprising:

creating pseudo-data representing theoretical electrical signals from a plurality of sensors;

fusing said pseudo-data representing said theoretical electrical signals while performing data inversion on said pseudo-data to yield a fused electrical signal theoretically representative of at least one physical characteristic of said site;

using said fused electrical signal in making at least one decision regarding the benefits of alternative remediation technologies.

7. An apparatus for processing electrical signals for site-characterization, comprising:

means for collecting measurements in the form of a plurality of electrical signals from a plurality of sensors;

means for fusing data representing said plurality of electrical signals while performing data inversion on said data to yield a fused electrical signal representative of at least one physical characteristic of said site;

means for displaying information related to said fused electrical signal, said information related to said fused electrical signal being useful in making decisions regarding remediation of said site.

8. The apparatus according to claim 7, wherein said information related to said fused electrical signal comprises an image representing at least one physical characteristic of said site.

9. The apparatus according to claim 8, wherein said means for displaying information related to said fused electrical comprises means for displaying said image over space and time.

10. The apparatus according to claim 7, wherein said information related to said fused electrical signal comprises information concerning the quantified accuracy of said fused electrical signal.

* * * * *

UNITED STATES PATENT AND TRADEMARK OFFICE
CERTIFICATE OF CORRECTION

PATENT NO. : 5,321,613  
DATED : June 14, 1994  
INVENTOR(S) : David W. Porter et al.

Page 1 of 2

It is certified that error appears in the above-indentified patent and that said Letters Patent is hereby corrected as shown below:

Title Page, Under Abstract, Line 13:  
Change "recursire" to read... --recursive--.  
In Specification, Column 3, Line 35:  
Change "recurslye" to read... --recursive--.  
Column 4, Line 28: Change "recursire" to read... --recursive--.  
Column 4, Line 31: Delete "computing" after inversion.  
Column 4, Line 32: Insert --computing-- after by.  
Column 4, Line 46: Change "recurslye" to read ... --recursive--.

Column 5. Line 8: Change "recurslye" to read... --recursive--.  
Column 5, Line 36: Change "workstationwhich" to read... --workstation which--.  
Column 7, Line 7: Delete "o". Column 8, line 8: Change "recursire" to read... --recursive--.

UNITED STATES PATENT AND TRADEMARK OFFICE
CERTIFICATE OF CORRECTION

PATENT NO. : 5,321,613
DATED : June 14, 1994
INVENTOR(S) : David W. Porter et al.

It is certified that error appears in the above-indentified patent and that said Letters Patent is hereby corrected as shown below:

```
Column 8, Line 2: Change "combine" to read...
--combiner--.
Column 8, Line 17: Change "publiclyavailable" to
read... --publicly available--.
Column 9, Line 57: After "stable" insert --.--.
Column 13, Line 54: Change "PARAMTRE" to read...
--PARAMETER--.
Column 13, Line 61: After site, delete ". .".
Column 14, Line 10: Change "ARmodel" to read ...
--AR model--.
Column 16, Line 20: Insert --is-- before zero.
Column 17, Line 45: Change "thethree" to read ...
--the three--.
Claim 3; Column 18, Line 48: Change "whenever"
to read ... --whether--.
```

Signed and Sealed this

Twenty-seventh Day of December, 1994

Attest:

BRUCE LEHMAN

Attesting Officer     Commissioner of Patents and Trademarks